May 8, 1962 M. SEIDNER 3,034,003
LIQUID COOLED ROTORS FOR TURBO-ALTERNATORS
Filed Oct. 7, 1959 11 Sheets-Sheet 1

Fig. 1

Mihály Seidner
INVENTOR

BY Blum, Moscovitz, Friedman & Blum
ATTORNEYS

Fig. 2

May 8, 1962 M. SEIDNER 3,034,003
LIQUID COOLED ROTORS FOR TURBO-ALTERNATORS
Filed Oct. 7, 1959 11 Sheets-Sheet 3

Mihály Seidner
INVENTOR

BY Blum, Moscovitz, Friedman & Blum
ATTORNEYS

May 8, 1962 M. SEIDNER 3,034,003
LIQUID COOLED ROTORS FOR TURBO-ALTERNATORS
Filed Oct. 7, 1959 11 Sheets-Sheet 4

Mihály Seidner
INVENTOR

BY Blum, Moscovitz, Friedman & Blum
ATTORNEYS

M. SEIDNER 3,034,003

LIQUID COOLED ROTORS FOR TURBO-ALTERNATORS

Filed Oct. 7, 1959

Mihály Seidner
INVENTOR

BY Blum, Moscovitz, Friedman & Blum
ATTORNEYS

United States Patent Office 3,034,003
Patented May 8, 1962

3,034,003
LIQUID COOLED ROTORS FOR
TURBO-ALTERNATORS
Mihály Seidner, 90 Pasareti ut, Budapest II, Hungary
Filed Oct. 7, 1959, Ser. No. 845,033
Claims priority, application Hungary Oct. 11, 1958
14 Claims. (Cl. 310—61)

This invention relates to liquid-cooled rotors for turbo-alternators.

As is known, such rotors have a rotor winding or oil built up of hollow conductors which communicate through passages in the body of the rotor with a stationary inlet and a stationary outlet for a liquid coolant such as the condensate of a steam turbine which is coupled with a turbo-alternator comprising the rotor. As a rule, the liquid coolant or condensate flows in parallelly connected groups of hollow conductors in the rotor winding which is connected to the passages in the rotor body by soldered three-way pipe connections in coil ends of the rotor winding and by disconnectable pipe joints between medial branches of the three-way pipe connections and the passages. Obviously, such pipe joints have to be tightly sealed so as to prevent escape of the liquid coolant and reliably insulated from the rotor body so as to obviate short-circuits of the rotor winding therethrough.

It has been suggested to accommodate the pipe joints between adjacent coil ends of the rotor winding, in which case both the coil ends and the pipe joints are likewise disposed in a pair of annular chambers normally provided for encompassing the coil ends only. As is known, such coil end chambers are confined peripherally by a pair of tightly fitting retaining rings the removal of which is cumbersome and yet indispensable whenever the sealing and insulation of pipe joints therein have to be inspected or repaired.

The main object of the present invention is to eliminate this difficulty and to provide a liquid-cooled rotor of the above described type wherein the pipe joints are capable of being inspected or repaired without removal of the retaining rings. This is obtained by disposing the pipe joints axially beyond the pair of annular coil end chambers. In case of such an arrangement the medial branch of the three-way pipe connection is suitably extended beyond the annular coil end chambers which then contain only the soldered three-way pipe connections in the coil ends of the rotor winding while the pipe joints proper with their sealings and insulations are readily accessible whenever inspection or repair is required.

It is, however, a further object of the present invention to render accessible even the three-way pipe connections in the coil ends of the rotor winding, likewise without removal of the retaining rings. For this purpose coil ends which comprise such three-way pipe connections are likewise extended through and beyond the annular coil end chambers.

A still further object of the present invention is to provide liquid-cooled rotor windings of the above described type capable of being constructed in a relatively simple manner. This is obtained by building up the hollow rotor winding of serially connected superposed layers of spiral configuration.

Another object of the present invention is to relieve the pipe joints from probable strains caused by thermal expansions of the rotor winding, for which purpose the extended portions of the rotor winding are fixed to partitions defining the annular coil end chambers in axial direction.

Still another object of the present invention is to arrange the passages in the rotor body so as to obviate substantial weakening of its cross-section. This is obtained by the provision of an axially offset arrangement of radial passages.

A further object of the present invention is to more effectively prevent short-circuits of the rotor winding by the liquid coolant and, therefore, to provide passages having linings made of electrically insulating material.

A still further object of the present invention is to enhance a temperature equalization among various portions of the rotor body, for which purpose a return passage for the liquid coolant is axially and centrally disposed in the rotor body.

As will be seen from the above, in its broadest terms the invention consists in a liquid-cooled rotor for turbo-alternators of the type having a cylindrical rotor body, a pair of annular coil end chambers disposed on and coaxially with said rotor body, a hollow rotor winding between a pair of collector rings on said rotor body and disposed partly in said pair of annular coil end chambers, a system of ducts for connection connected to a stationary inlet and a stationary outlet for a liquid coolant and comprising said hollow rotor winding and passages in said rotor body, and pipe joints connecting said hollow rotor winding with said passages in said rotor body wherein said pipe joints are, according to the main feature of the invention, disposed axially beyond said pair of annular coil end chambers.

The invention will now be described in closer details by reference to the accompanying drawings which show, by way of example, several embodiments thereof and in which.

Same reference characters designate similar details throughout the drawings.

Figure 1:
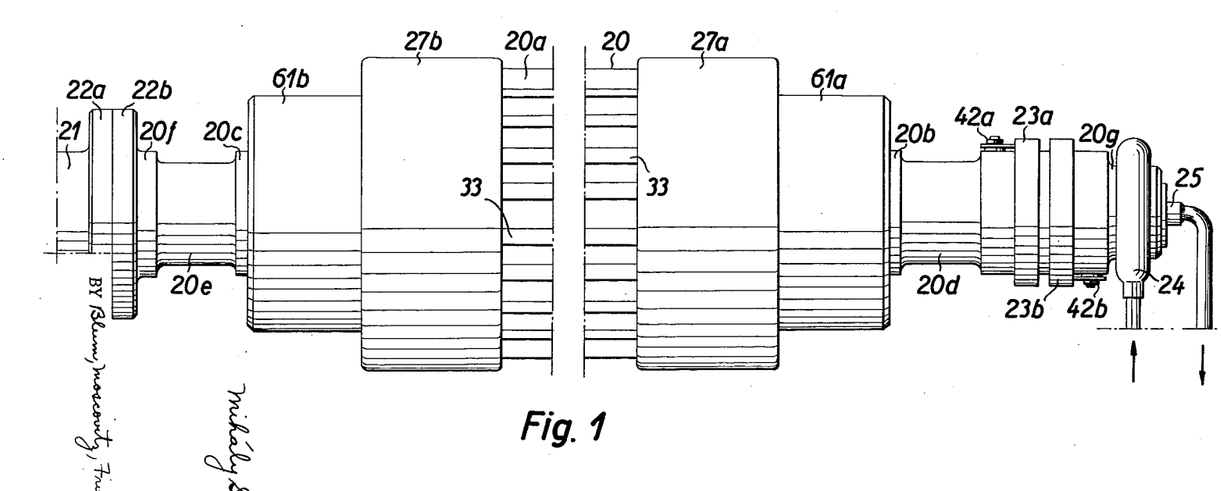
FIG. 1 is a general side elevational view of a rotor incorporating the invention.

More particularly, FIG. 1 shows a cylindrical rotor body 20 of the solid type having a medial portion 20a of relatively greater diameter and a pair of lateral portions 20b and 20c of relatively smaller diameter. The latter comprise axle pins 20d and 20e, respectively, for support by axial bearings of a stator (not shown). One end 20f of the rotor 20 may be coupled to a shaft 21 of a steam turbine (not shown) by means of a coupling the members of which are designated by reference characters 22a and 22b. The other end 20g of the rotor carries a pair of collector rings 23a and 23b and can interengage with a stationary inlet 24 and a stationary outlet 25 for a liquid coolant in a manner known per se.

Figure 2:
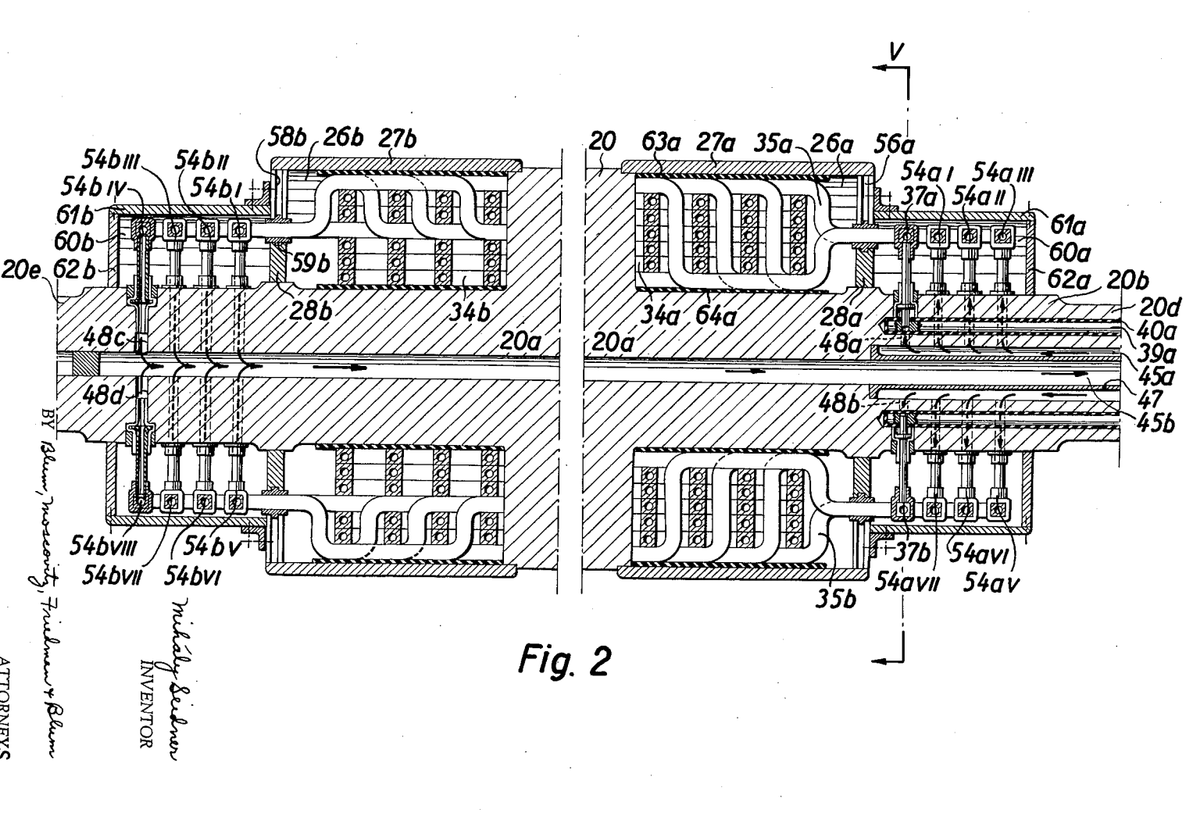
FIG. 2 is a longitudinal sectional view of an exemplified embodiment of the invention taken along line II—II of FIG. 5.

As can be seen e.g. from FIG. 2, the rotor has a pair of annular coil end chambers 26a and 26b disposed on and coaxially arranged with the rotor body 20. In the exemplified embodiment these annular coil end chambers 26a and 26b are defined by the rotor body 20, by a pair of retaining rings 27a and 27b adjacent to the medial portion 20a and coaxially arranged with the pair of lateral portions 20b and 20c of the rotor body 20, and by a pair of annular centering disks 28a and 28b coaxially arranged with said pair of lateral portions 20b and 20c and fitting the inner periphery of said pair of retaining rings 27a and 27b, respectively.

Furthermore, the rotor is provided, substantially in a manner known per se, with a hollow rotor winding connected between said pair of collector rings 23a and 23b and disposed partly in said pair of annular coil end chambers 26a and 26b.

Figure 3:
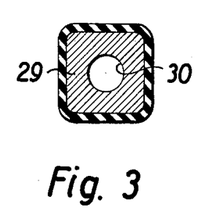
FIGS. 3 and 4 are cross-sectional views of exemplified embodiments of hollow conductors used for building up the rotor winding of the rotor according to the invention, on a larger scale.
Figure 4:
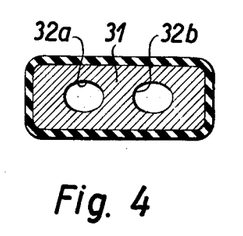

In the exemplified embodiments, the rotor winding is built up of hollow conductors 29 having a single passage 30 for the liquid coolant as shown in FIG. 3. Obviously, hollow conductors of other cross-sectional shape, e.g. hollow conductors 31 having double passages 32a and 32b for the liquid coolant and illustrated in FIG. 4 may be used as well. The hollow conductors 29 lie in axial slots 33 of the cylindrical surface of the medial portion 20a of the rotor body 20 and are connected in series by coil ends 34a and 34b in said annular coil end chambers 26a and 26b, respectively. It is noted that the term "coil end" in the present specification and in the appended claims designates portions of the rotor winding between a pair of axial slots subsequently traversed by serially connected hollow conductors whereas the term "hollow conductor" is used for labelling portions of the rotor winding disposed in the slots 33 of the rotor.

Figure 5:
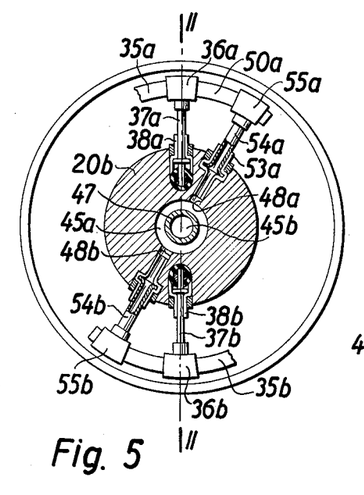
FIG. 5 is a cross-sectional view taken along line V—V of FIG. 2.
Figure 6:
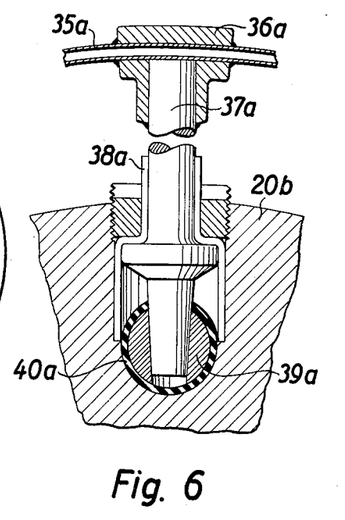
FIG. 6 is a partial sectional view illustrating a detail of FIG. 5 on a larger scale.
Figures 7, 8:
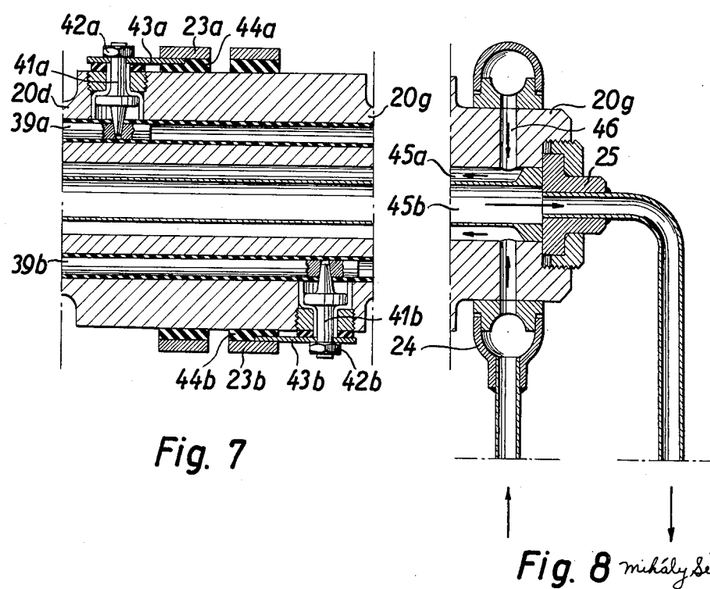
FIGS. 7 and 8 are sectional views illustrating details of FIG. 2 on a larger scale.

A pair of hollow leads 35a and 35b of the rotor winding serves for connecting it in series between said pair of collector rings 23a and 23b. Means for such connections being well known in the art, an exemplified embodiment thereof will be described in concise form by reference to FIGS. 5 and 6. The hollow leads 35a and 35b have lugs 36a and 36b of the three-way pipe connection type soldered to them, which are tightly engaged with and soldered to radially disposed rods 37a and 37b made of electrically conducting material and insulated from one lateral portion 20b of the rotor body 20 by tubular casings 38a and 38b made of electrically insulating material, respectively. The radially disposed rod 37a, in turn, tightly fits a radial bore of conical shape of an axially disposed solid conductor rod 39a arranged in and insulated from the lateral portion 20b by a tubular insulating sleeve 40a. A like construction is applied for connecting the solid conductor rod 39a to the collector ring 23a, as shown in FIG. 7, wherein reference character 41a designates a radially disposed conductor rod with a fixing nut 42a whereas reference character 43a refers to a terminal plate contacting the collector ring 23a and reference character 44a labels an insulating ring by means of which terminal plate 43a and collector ring 23a are insulated from the end 20g of the rotor body 20. Similar means are applied for connecting the radially disposed solid conductor rod 37b to the collector ring 23b.

Furthermore, the rotor is provide, likewise in a substantially known manner, with a system of ducts between said stationary inlet 24 and said stationary outlet 25. This duct system consists, on the one hand, of the hollow rotor winding 29, 34a, 34b, 35a, 35b and, on the other hand, of passages in the rotor body 20.

In the instant case, a pair of axial passages 45a and 45b is provided for admittance and return, respectively, of the liquid coolant. The axial passage 45b serving as return connection and opening axially into said stationary outlet 25 is centrally disposed in and extended throughout the rotor body 20 so as to enhance an equalization of temperatures prevailing in various portions 20a to 20g thereof. The axial passage 45a for the admittance of the cooler liquid and communicating through radial bores 46 with an annular chamber of said stationary inlet 24 is arranged coaxially with said return connection passage 45b from which it is separated by a cylindrical partition 47, as shown in FIG. 2. Obviously, other arrangements of such axial passages or more than a pair thereof might be applied as well. Moreover, it is possible to interchange the functions of the axial passages 45a and 45b should requirements of cooling be more favourably met thereby.

The pair of axial passages 45a and 45b pairwise communicates with a pair of groups of radial passages which are, in the longitudinal sectional views, illustrated partly by dashed lines and shifted into the plane of the drawing, and pairs of which are designated by reference characters 48a and 48b as well as by 48c and 48d. With the represented embodiments, said radial passages are disposed in pairwise axially offset arrangements and, thus, lie pairwise in different cross-sectional areas of the rotor body which is, then, relatively less weakened by such passages. Obviously, it is possible to axially offset all radial passages, the axial length of the rotor body being but slightly increased by such expedient.

Communication between the passages in the rotor body and the hollow rotor winding is effected by a pair of groups of pipe joints which have hitherto been accommodated in said pair of annular coil end chambers 26a and 26b whereas, according to the main feature of the present invention, they are disposed axially therebeyond for which purpose said pair of groups of radial passages is likewise disposed axially beyond said pair of annular coil end chambers 26a and 26b. Moreover, in the instant case, said pipe joints further have a radial disposition which permits a relatively simple connection thereof with said radial passages.

Figure 9:
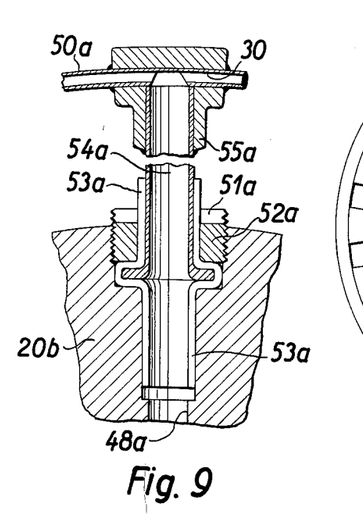
FIG. 9 is a partial sectional view illustrating a detail of FIG. 5 on a larger scale.

Details of the connection of the pipe joints with the radial passages in the rotor body and with the hollow rotor winding are shown more particularly in FIG. 9, which shows an innermost radial passage 48a as connected by a pipe joint to an electrically inoperative extended portion 50a of one hollow lead 35a of the rotor winding. The peripheral portion of the radial passage 48a is of increased diameter and in threaded engagement with a pair of counternuts 51a and 52a which are rotatably disposed on a longitudinally subdivided tubular casing 53a made of electrically insulating material and arranged coaxially with the radial passage 48a. The tubular casing 53a embraces a radially disposed pipe 54a, the radially outward extremity of which joins a radially disposed medial branch of a three-way pipe connection 55a. This, in turn, engages said extended portion 50a so as to permit a flow of the liquid coolant through passage 30 in the extended portion 50a and and through pipe 54a. The pair of counternuts 51a and 52a when tightened fixes the mutual position of pipe 54a and radial passage 48a and provides a tight sealing against leakage of the liquid coolant. In the instant case, the tubular casing 53a has a portion radially extended beyond the radially inward extremity of pipe 54a so as to provide the radial passage 48a with a lining of electrically insulating material by which possible short-circuits between the rotor winding and the rotor body through the liquid coolant are more effectively counteracted. However, the application of such a lining is not compulsory for the pipe joint proper which rather consists, as can be seen from what has been said above, of the pair of counternuts 51a and 52a, and of the radially outward portion of the tubular casing 53a. Moreover, it is, among other things, also possible to dispense with such pipe joints altogether and to substitute them by a pipe end welded to the rotor body and connected to the three-way pipe connection 55 through an intermediary releasable pipe joint made of electrically insulating material.

The remainder of the pipe joints is connected to the hollow rotor winding in a similar manner and to different portions thereof so that parallel groups of cooling ducts are formed therein and an effective cooling action is obtained.

Connection of the pipe joints with individual turns of the rotor winding could also be effected in a manner wherein one coil end of such turns comprises the above described three-way pipe connection within an annular coil end chamber of said pair of such chambers and the pipe joining its medial branch is extended beyond this annular coil end chamber so as to be fixed by its associated pipe joint to the rotor body. It is preferable, however, to arrange also the soldered three-way pipe connections outside the coil end chambers, as in the instant case, since then the soldered connections can be inspected and repaired, if necessary, likewise without removal of the retaining rings. Moreover, their making is substantially facilitated thereby since, in lieu of the relatively crowded coil end chambers, it can be effected where ample space is at disposal. Such an arrangement means that some of the coil ends are extended beyond said pair of annular coil end chambers 26a and 26b, that is beyond said pair of annular centering disks 28a and 28b, respectively.

Figure 10:
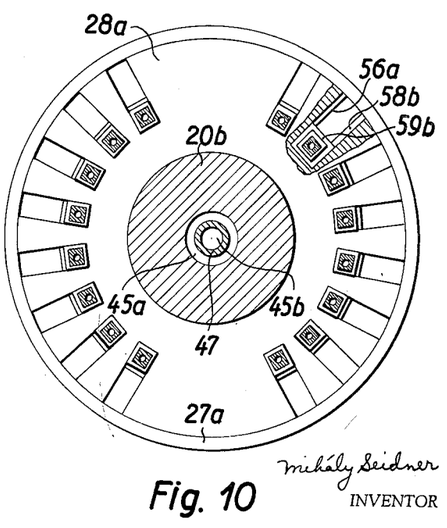
FIG. 10 is a front elevational view of a detail of FIG. 2.
Figure 11:
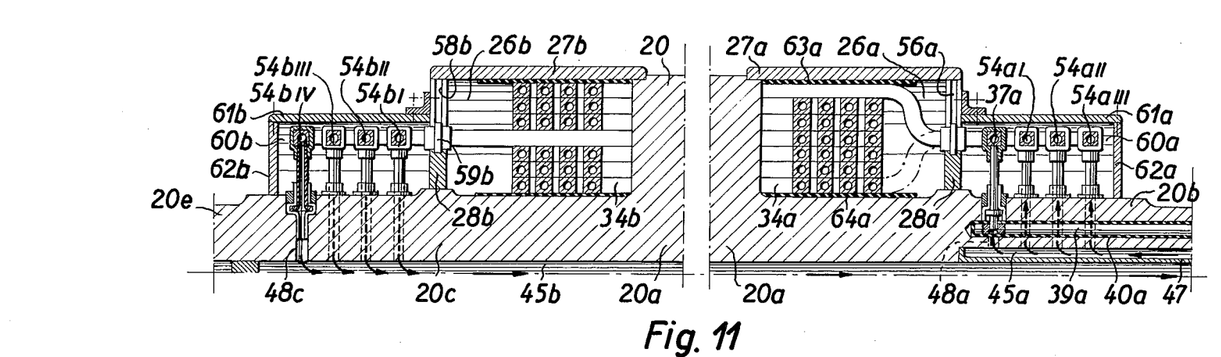
FIG. 11 is a longitudinal sectional view of another exemplified embodiment of the invention.

For this purpose, the annular centering disks 28a and 28b are provided each with a pair of groups of axial grooves. Obviously, such axial grooves preferably register with the slots 33 which support the hollow conductors 29. Due to electric requirements, the slots form groups of associated pairs of slots and, thus, the axial grooves of the centering disks may likewise be distinguished as associated pairs. Such an associated pair of grooves is referred to by reference characters 56a and 57a in FIG. 10 showing the centering disk 28a from outside the annular coil end chamber 26a.

The axial grooves of the centering disks are also provided with radial grooves which engage shoulders of the coil ends and of the hollow leads extended therethrough. A pair of such interengaged radial grooves and shoulders is referred to by reference characters 58b and 59b, respectively, in the drawing. Obviously, said radial grooves and said shoulders therein form clamp means which fix the hollow coil ends and the hollow leads extended therethrough to the centering disks of the retaining rings whereby the above discussed pipe joints are relieved from thermal expansions of the rotor winding.

In the represented embodiments, both said pipe joints and said three-way pipe connections are encompassed by a pair of additional annular chambers 60a and 60b defined by said pair of lateral portions 20b and 20c of the rotor body 20, by said pair of annular centering disks 28a and 28b, a pair of cylindrical casings 61a and 61b adjacent thereto and by a pair of additional centering disks 62a and 62b fitting the inner periphery of said cylindrical casings 61a and 61b, respectively. Thus, the annular centering disks 28a and 28b form a pair of partitions between adjacent chambers 26a, 62a and 26b, 62b, respectively, of both pairs of annular chambers 26a, 26b and 62a, 62b.

Obviously, the cylindrical casings 61a and 61b which are of considerably smaller diameter than the retaining rings 27a and 27b and, thus, of lesser weight, have only the function of encompassing portions of the rotor with protruding components such as the pipe joints or the three-way pipe connections whereas the retaining rings are acted upon by the coil ends which they have to support against the action of centrifugal force. It is due to this that the retaining rings 27a and 27b are tightly pushed over the coil ends as shown by the presence of cylindrical compound layers between the retaining rings, the coil ends and the rotor body, a pair of such layers being designated by reference characters 63a and 64a in the longitudinal sectional views. Consequently, such retaining rings are, in their operational position, difficult to remove.

In contradistinction, the cylindrical casings 61a and 61b are clear of what is comprised by the additional annular chambers and can, therefore, be easily removed, e.g. by unscrewing screwnuts indicated by dash-and-dot lines in the longitudinal sectional views, whereupon pipe joints and three-way pipe connections on the respective side of the rotor become readily accessible.

As can be seen from FIG. 2, extension of the coil ends beyond the annular coil end chambers normally requires repeated bending of the coil ends at right angles which is a cumbersome operation. Furthermore, the bent coil end portions require considerable space and thereby unduly increase the axial length of the rotor.

An exemplified embodiment obviating this difficulty is represented in FIGS. 11 and 12, FIGS. 13a and 13b showing a complete winding diagram thereof. Here, the rotor winding comprises its axially extending hollow conductor loops disposed above one another in pairs of radially disposed columns and connected in series. These columns are accommodated in groups of pairwise associated axial slots, such as slots 33a and 33b in FIG. 12, and consist each of seven superposed hollow conductors of the type shown in FIG. 3. The hollow conductors in the slots of the rotor are connected by hollow coil ends or coil heads 34a and 34b within said pair of annular coil end chambers 26a and 26b, respectively, and by hollow coil ends, such as coil ends 34aI to 34aIV and 34bI to 34bIV in FIG. 12, extended from within said pair of annular coil end chambers 26a and 26b through said axial passages 56a and 56b into said pair of additional annular chambers 60a and 60b, respectively, in series so as to form a group of serially connected turns.

Figure 12:
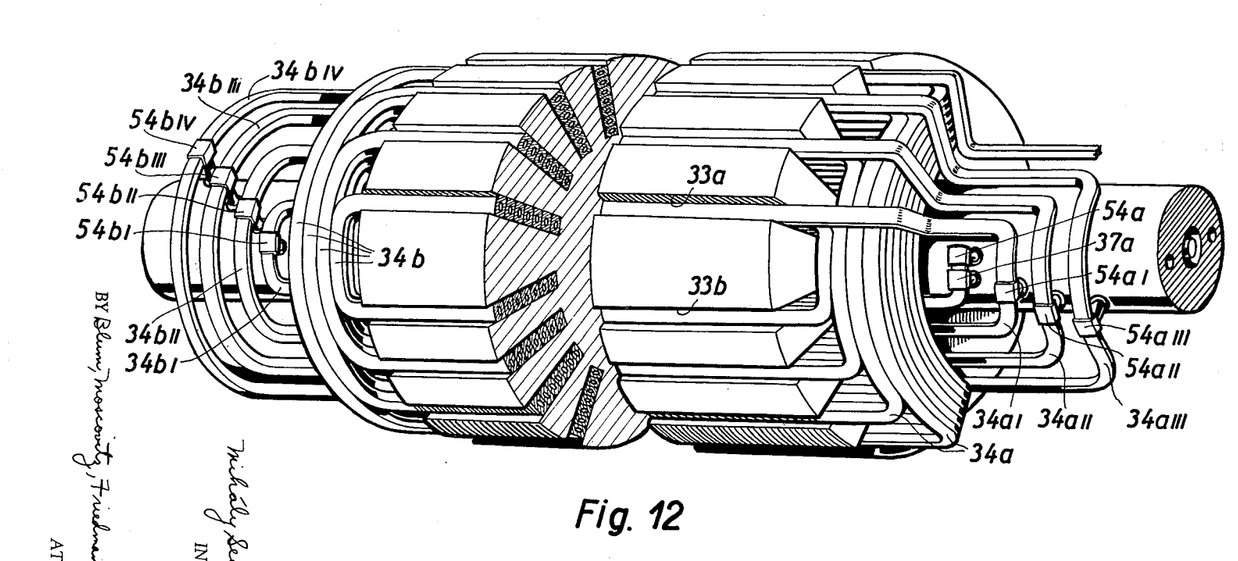
FIG. 12 is a perspective view of the rotor body and the rotor winding of the embodiment shown in FIG. 11.
Figure 13A:
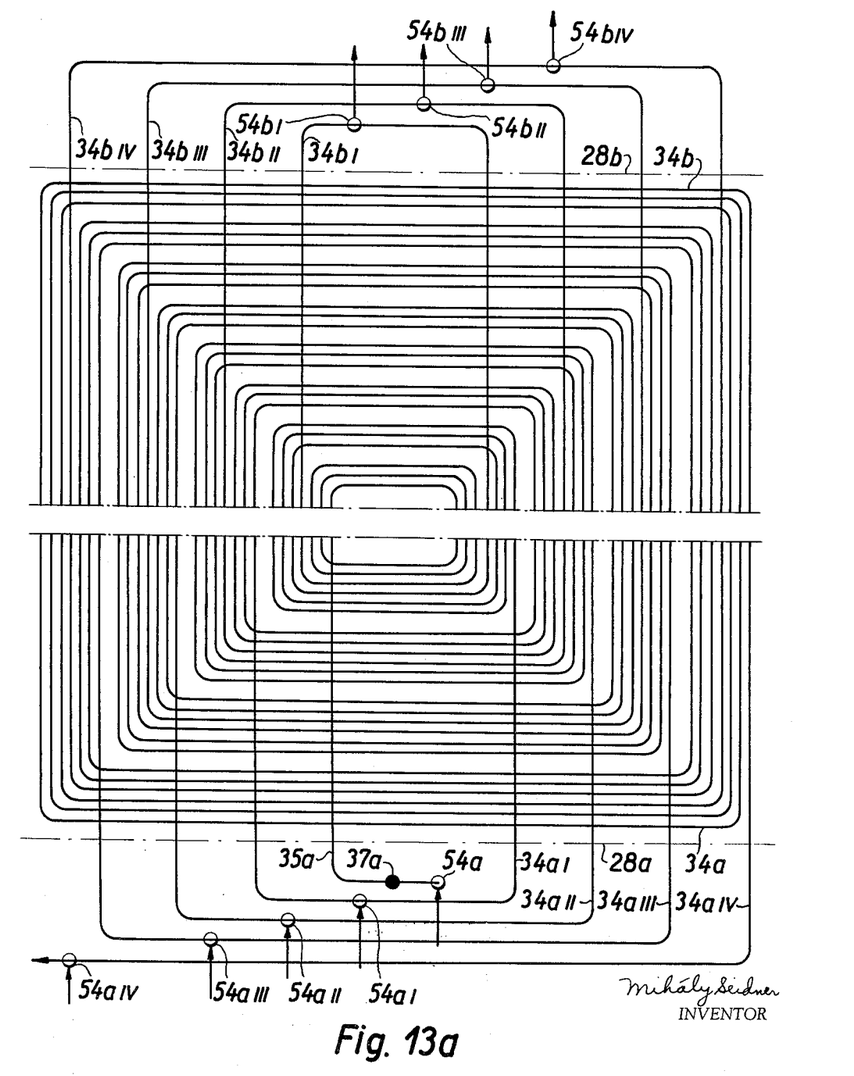
FIGS. 13a and 13b are winding diagrams of the embodiment shown in FIGS. 11 and 12.
Figure 13B:
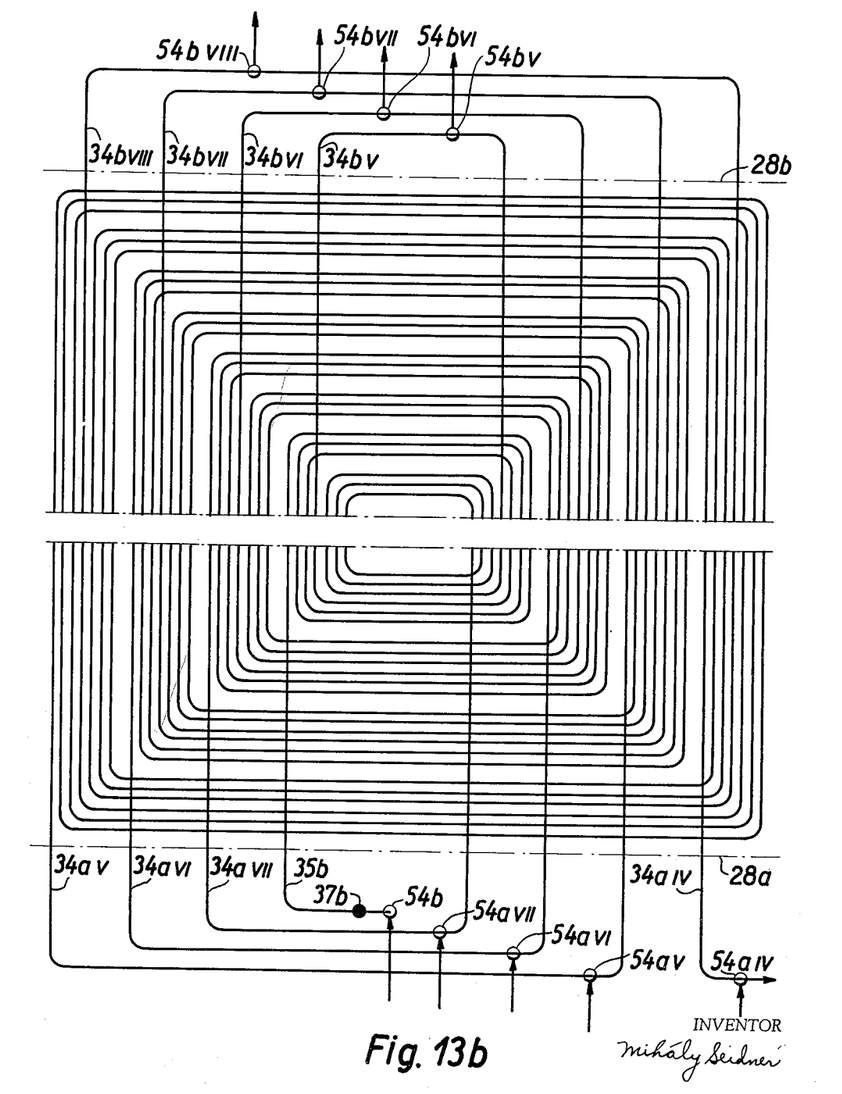

A corresponding arrangement of hollow conductors, hollow coil ends 34a and 34b and extended hollow coil ends 34aV to 34aVII and 34bV to 34bVII is provided on the opposite side of the rotor and forms another group of serially connected turns which is connected in series with the former group of turns by coil end 34aIV so as to define a pair of poles of the rotor suggested by the symbols "+" and "−" in the winding diagrams illustrated in FIGS. 13a and 13b, respectively. The rotor winding proper consists of both groups of serially connected turns shown in the winding diagrams. Three-way pipe connections and pipe joints associated with various extended coil ends are referred to in the winding diagrams by elements which are common to both, that is pipes 54aI to 54aVII and 54bI to 54bVIII, of which 54aIV is common to both poles of the rotor and joins the coil end 34aIV connecting both groups of turns in series.

As can be seen, the extended hollow coil heads 34aI to 34aVII in the additional chamber 60a connect pairwise topmost hollow conductors and bottom hollow conductors in slots of different pairs of pairwise associated axial slots whereas in the other additional chamber 60b the extended hollow coil ends 34bI to 34bVIII connect intermediate hollow conductors in slots of the same pairs of pairwise associated axial slots. The hollow coil ends 34a and 34b within the annular coil end chambers 26a and 26b, respectively, connect pairs of the remainder of the hollow conductors in pairwise associated slots of the rotor body in the usual manner. Obviously, the number of parallel connected groups of ducts in the rotor winding can be increased by extending more coil ends from the annular coil end chambers into the additional coil end chambers and by providing a corresponding number of pipe joints and radial passages, if necessary.

What matters in the instant case, is that said extended hollow coil ends 34aI to 34aVII and 34bI to 34bVIII are the more extended the greater are the mutual peripheral distances of the pairwise connected hollow conductors. Due to such mutually different extensions of the coil ends the more extended coil ends comprise unobstructed passages for less extended ones as can well be seen in FIG. 12. This means, however, that bending of the extended coil heads at right angles can be dispensed with. Instead, they are capable of being extended axially along straight lines.

Figure 14:
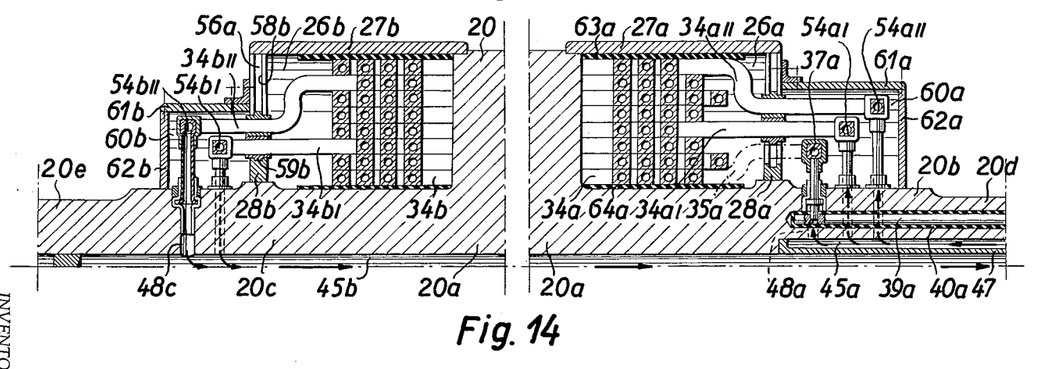
FIG. 14 is a longitudinal sectional view of still another exemplified embodiment of the invention.
Figure 15:
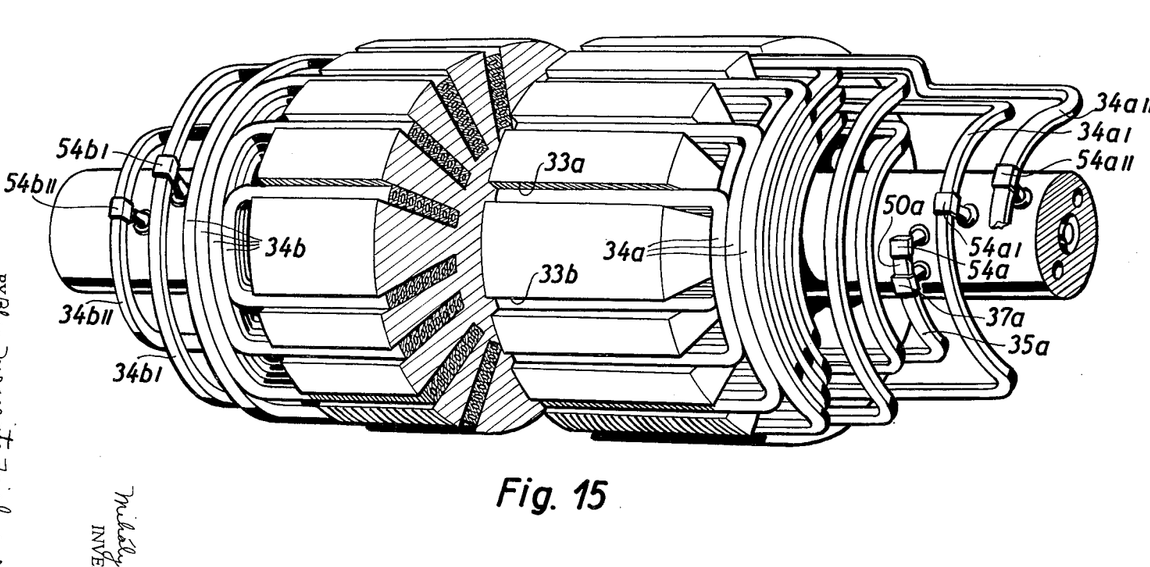
FIG. 15 is a perspective view of the rotor body and the rotor winding of the embodiment shown in FIG. 14.
Figure 16A:
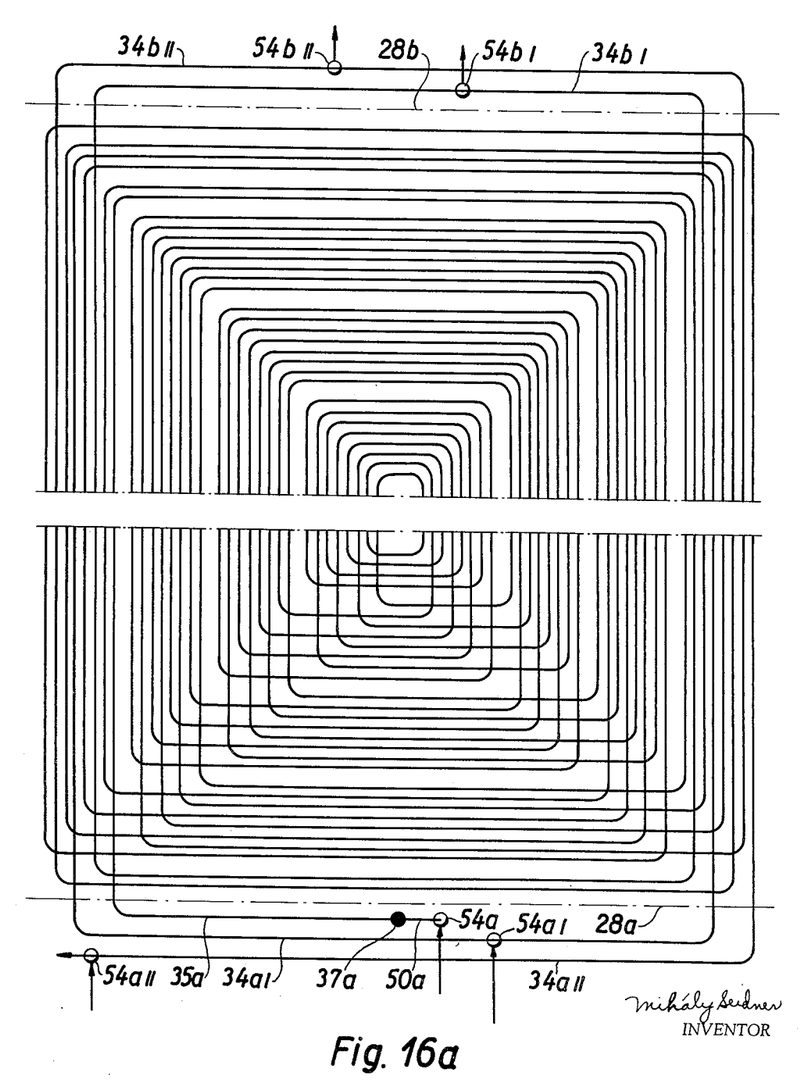
FIGS. 16a and 16b are winding diagrams of the embodiment according to FIGS. 14 and 15.
Figure 16B:
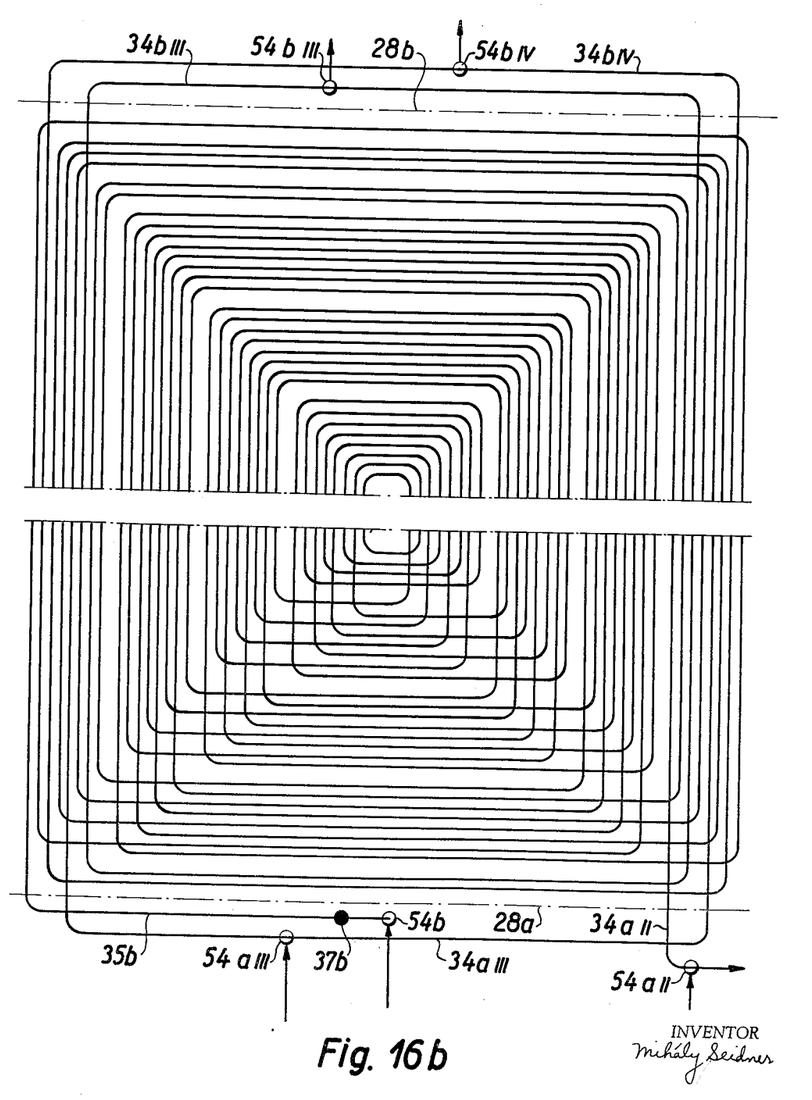

FIGS. 14 and 15 illustrate an embodiment which is distinguished by its simple construction and is particularly suitable for turbo-alternators of reduced output. Here, extended hollow coil ends 34aI and 34aIII in additional chamber 60a connect first pairs of intermediate hollow conductors, and extended hollow coil head 34aII connects top and bottom hollow conductors in outermost pairs of slots. In the other additional chamber 60b extended hollow coil ends 34bI to 34bIV connect second and third pairs of intermediate hollow conductors below and above said first pair of intermediate hollow conductors, respectively, likewise in outermost pairs of slots. The hollow coil heads 34a and 34b in the annular coil end chambers 26a and 26b connect pairs of the remainder of hollow conductors in a manner such that hollow conductors of the same level are immediately connected in series whereby a layer of spiral configuration is obtained. Since such layers are superposed and connected in series so as to obtain compact packages of coil ends, the spiral configurations of adjacent layers will obviously be of opposite directions as can be readily seen from FIGS. 16a and 16b which show a complete winding diagram of the rotor winding. Both the hollow leads 35a and 35b, and the extended hollow coil ends 34aI to 34aIII as well as 34bI to 34bIV being connected to hollow conductors disposed in outermost pairs of slots, an axial extension thereof is rendered possible along a straight line and without interfering with the remainder of the coil ends 34a and 34b which are all unextended and encompassed by the usual coil end chambers 26a and 26b, respectively, where no three-way pipe connections or pipe joints are present.

Arrows in the drawings indicate flow directions of a liquid coolant traversing the hollow rotor winding and the passages in the rotor body.

Gaps or windows left by extended coil ends between superposed unextended coil ends are preferably filled by compound inlays (not shown) by which such coil ends are supported against action of centrifugal forces.

The invention has been illustrated by embodiments having one pair of poles. Obviously, multipoled rotors can be likewise constructed so as to embody the invention. E.g. in case of a double pole rotor a further arrangement of opposite groups of serially connected turns, extended coil ends and leads as well as pipe joints will be applied at right angles to such arrangements illustrated in the drawings.

What I claim is:

1. A liquid-cooled rotor for turbo-alternators, having a cylindrical rotor body, a pair of annular coil end chambers disposed on and coaxially arranged with said rotor body, a hollow rotor winding between a pair of collector rings on said rotor body and disposed partly in said pair of annular coil end chambers, a system of ducts for connection to a stationary inlet and a stationary outlet for a liquid coolant and comprising said hollow rotor winding and passages in said rotor body, and pipe joints disposed axially beyond said pair of annular coil end chambers and connecting said hollow rotor winding with said passages in said rotor body.

2. A liquid-cooled rotor for turbo-alternators, having a cylindrical rotor body, a pair of annular coil end chambers disposed on and coaxially arranged with said rotor body, a hollow rotor winding between a pair of collector rings on said rotor body, said hollow rotor winding having hollow leads and hollow coil ends extended beyond said pair of annular coil end chambers, three-way pipe connections in said extended hollow leads and hollow coil ends axially beyond said pair of annular coil end chambers, a system of ducts for connection to a stationary inlet and a stationary outlet for a liquid coolant and comprising said hollow rotor winding and passages in said rotor body, and pipe joints disposed axially beyond said pair of annular coil end chambers and connecting said laterally disposed three-way pipe connections in said extended hollow leads and hollow coil ends with said passages in said rotor body.

3. A liquid-cooled rotor for turbo-alternators, having a cylindrical rotor body with a medial portion of greater diameter and with a pair of lateral portions of smaller diameter, a pair of annular coil end chambers disposed laterally of said medial portion and coaxially arranged with said pair of lateral portions, axial slots in the cylindrical surface of said medial portion, hollow conductors in said axial slots, hollow coil ends disposed at least partly within said pair of annular coil end chambers and connecting said hollow conductors in series so as to form at least one pair of groups of serially connected turns defining a pair of poles of the rotor, a pair of hollow leads connected to said pair of groups of serially connected turns in series, passages in said rotor body suitable for communicating with a stationary inlet and a stationary outlet, respectively, for a liquid coolant, pipe joints disposed laterally of said pair of annular coil end chambers and communicating with said pair of groups of serially connected turns and said pair of hollow leads, respectively, and with said passages so as to unite said pair of groups of serially connected turns, said pair of hollow leads and said passages to a closed system of ducts suitable for conducting a liquid coolant from said stationary inlet to said stationary outlet, a pair of collector rings disposed on and coaxially arranged with said rotor body, and connection means electrically connecting said pair of hollow leads pairwise with said pair of collector rings.

4. A liquid-cooled rotor for turbo-alternators, having a cylindrical rotor body with a medial portion of greater diameter and with a pair of lateral portions of smaller diameter, a pair of annular coil end chambers disposed laterally of said medial portion and coaxially arranged with said pair of lateral portions, axial slots in the cylindrical surface of said medial portion, hollow conductors in said axial slots, hollow coil ends partly disposed within said pair of annular coil end chambers and partly extended therebeyond, said hollow coil ends and said extended hollow coil ends connecting said hollow conductors in series so as to form at least one pair of groups of serially connected turns and defining a pair of poles of the rotor, a pair of hollow leads connected to said pair of groups of serially connected turns in series and extended through said pair of annular coil end chambers therebeyond so as to have portions disposed laterally thereof, said pair of groups of serially connected turns and said pair of hollow leads forming a hollow rotor winding, passages in said rotor body suitable for communicating with a stationary inlet and a stationary outlet, respectively, for a liquid coolant, pipe joints disposed laterally of said pair of annular coil end chambers and communicating with said extended hollow coil ends and with said laterally disposed portions of said pair of hollow leads, respectively, and with said passages so as to unite said hollow rotor winding and said passages to a closed system of ducts for conducting a liquid coolant from said stationary inlet to said stationary outlet, a pair of collector rings disposed on and coaxially arranged with said rotor body, and connection means electrically connecting said laterally disposed portions of said pair of hollow leads pairwise with said pair of collector rings.

5. A liquid-cooled rotor for turbo-alternators, having a cylindrical rotor body with a medial portion of greater diameter and with a pair of lateral portions of smaller diameter, a pair of annular coil end chambers disposed laterally of said medial portion and arranged coaxially with said rotor body, a pair of additional annular chambers disposed laterally of and adjacent to said pair of annular coil end chambers and coaxially with said pair of lateral portions, said pair of annular coil end chambers pairwise communicating with said pair of additional annular chambers through axial passages between adjacent chambers of said pair of annular chambers, axial slots in the cylindrical surface of said medial portion, hollow conductors in said axial slots, hollow coil ends within said pair of annular coil end chambers and hollow coil ends extended from within said pair of annular coil end chambers through said axial passages into said pair of additional annular chambers, said hollow coil ends and said extended hollow coil ends connecting said hollow conductors in series so as to form at least one pair of groups of serially connected turns and defining a pair of poles of the rotor, a pair of hollow leads connected to said pair of groups of serially connected turns in series and extended from within said pair of annular coil end chambers through said axial passages into said pair of additional annular chambers, said pair of groups of serially connected turns and said pair of hollow leads forming a hollow rotor winding, passages in said rotor body opening into said pair of additional annular chambers and suitable for communicating with a stationary inlet and a stationary outlet, respectively, for a liquid coolant, a pair of groups of pipe joints in said pair of additional annular chambers and connecting said extended hollow coil ends and said pair of extended hollow leads therein with said passages opening thereinto so as to unite said rotor winding and said passages in said rotor body to a closed system of ducts suitable for conducting a liquid coolant from said stationary inlet to said stationary outlet, said serially connected hollow conductors in said system forming parallelly connected groups of said ducts, a pair of collector rings disposed on and coaxially arranged with said pair of lateral portions of said rotor body, and connection means in said pair of additional annular chambers and in said rotor body electrically connecting said pair of extended hollow leads pairwise with said pair of collector rings.

6. A liquid-cooled rotor for turbo-alternators, having a cylindrical rotor body, a pair of annular coil end chambers disposed on and coaxially arranged with said rotor body, a hollow rotor winding between a pair of collector rings on said rotor body and disposed partly in said pair of annular coil end chambers, said hollow rotor winding consisting of serially connected superposed layers of spiral configuration, said layers being coaxially arranged with said rotor body and the spiral configurations of adjacent layers being of opposite directions, passages in said rotor body for connection to a stationary inlet and a stationary outlet, respectively, for a liquid coolant, a system of ducts comprising said hollow rotor winding and said passages for conducting a liquid coolant from said stationary inlet to said stationary outlet, and pipe joints disposed axially beyond said pair of annular coil end chambers and connecting said hollow rotor winding with said passages.

7. A liquid-cooled rotor for turbo-alternators, having a cylindrical rotor body with a medial portion of greater diameter and with a pair of lateral portions of smaller diameter, a pair of annular coil end chambers disposed laterally of said medial portion and coaxially with said pair of lateral portions, axial slots in the cylindrical surface of said medial portion, superposed hollow conductors in said axial slots disposed in layers of various levels coaxial with said rotor body, hollow coil ends disposed at least partly within said pair of annular coil end chambers and connecting hollow conductors of the same level in spiral configuration and said layers of various levels in series at opposite directions of the spiral configurations of adjacent layers so as to form at least one pair of groups of serially connected turns defining a pair of poles of the rotor, a pair of hollow leads connected to said pair of groups of serially connected turns in series and forming a hollow rotor winding therewith, passages in said rotor body suitable for communicating with a stationary inlet and a stationary outlet, respectively, for a liquid coolant, pipe joints disposed laterally of said pair of annular coil end chambers and communicating with said hollow rotor winding and with said passages so as to unite said hollow rotor winding and said passages to a closed system of ducts suitable for conducting a liquid coolant from said stationary inlet to said stationary outlet, a pair of collector rings disposed on and coaxially arranged with said rotor body, and connection means electrically connecting said pair of hollow leads pairwise with said pair of collector rings.

8. A liquid-cooled rotor for turbo-alternators, having a cylindrical rotor body with a medial portion of greater diameter and with a pair of lateral portions of smaller diameter, a pair of annular coil end chambers disposed laterally of said medial portion and coaxially with said rotor body, a pair of additional annular chambers disposed laterally of and adjacent to said pair of annular coil end chambers and coaxially with said pair of lateral portions, said pair of annular coil end chambers pairwise communicating with said pair of additional annular chambers through axial passages between adjacent chambers of said pairs of annular chambers, groups of pairwise associated axial slots in the cylindrical surface of said medial portion, hollow conductors disposed in said pairwise associated axial slots, hollow coil ends within said pair of annular coil end chambers and hollow coil ends extended from within said pair of annular coil end chambers through said axial passages into said pair of additional annular chambers, said extended hollow coil ends in one chamber of said pair of additional annular chambers connecting first pairs of intermediate hollow conductors in outermost pairs of said pairwise associated axial slots, said extended hollow coil ends in the other chamber of said pair of additional annular chambers connecting second and third pairs of intermediate hollow conductors below and above said first pairs of intermediate hollow conductors, respectively, likewise in said outermost pairs of pairwise associated axial slots, and said hollow coil ends in said pair of annular coil end chambers connecting pairs of the remainder of said hollow conductors in said axial slots, said hollow coil ends and said extended hollow coil ends connecting said hollow conductors in series so as to form at least one pair of groups of serially connected turns defining a pair of poles of the rotor and consisting of serially connected layers of spiral configuration, said layers being coaxially arranged with said rotor body and the spiral configurations of adjacent layers being of opposite directions, a pair of hollow leads connected by means of hollow conductors in outermost axial slots of different groups of said pairwise associated axial slots to said pair of groups of serially connected turns in series and extended from within said pair of annular coil end chambers through said axial passages into said pair of additional annular chambers, said pair of groups of serially connected turns and said hollow leads forming a hollow rotor winding, passages in said rotor body opening into said pair of additional annular chambers and suitable to communicate with a stationary inlet and a stationary outlet, respectively, for a liquid coolant, a pair of groups of pipe joints in said pair of additional annular chambers and connecting said extended hollow coil ends and said pair of extended hollow leads therein with said passages opening thereinto so as to unite said hollow rotor winding and said passages in said rotor body to a closed system of ducts suitable for conducting a liquid coolant from said stationary inlet to said stationary outlet, said serially connected turns in said system forming parallelly connected groups of said ducts, a pair of collector rings disposed on and coaxially arranged with said pair of lateral portions of said rotor body, and connection means in said pair of additional annular chambers and in said rotor body electrically connecting said pair of extended hollow leads pairwise with said pair of collector rings.

9. A liquid-cooled rotor for turbo-alternators, having a cylindrical rotor body with a medial portion of greater diameter and with a pair of lateral portions of smaller diameter, a pair of annular coil end chambers disposed laterally of said medial portion and coaxially with said rotor body, said pair of annular coil end chambers being confined by said rotor body, by a pair of retaining rings adjacent to said medial portion and coaxially arranged with said pair of lateral portions, and by a pair of annular centering disks coaxially arranged with said pair of lateral portions and fitting the inner periphery of said pair of retaining rings, a pair of additional annular chambers disposed laterally of and adjacent to said pair of annular coil end chambers and coaxially with said pair of lateral portions, said pair of additional annular chambers being confined by said pair of lateral portions, by said pair of annular centering disks, by a pair of cylindrical casings coaxially arranged with said pair of lateral portions and adjacent to said pair of annular centering disks, and by a pair of additional annular centering disks coaxially arranged with and fitting the inner periphery of said pair of cylindrical casings, said pair of annular coil end chambers pairwise communicating with said pair of additional annular chambers through axial passages in said pair of annular centering disks, axial slots in the cylindrical surface of said medial portion, hollow conductors in said axial slots, hollow coil ends within said pair of annular coil end chambers and hollow coil ends extended from within said pair of annular coil end chambers through said axial passages in said pair of annular centering disks into said pair of additional annular chambers, said hollow coil ends and said extended hollow coil ends connecting said hollow conductors in series so as to form at least one pair of groups of serially connected turns defining a pair of poles of the rotor, a pair of hollow leads connected to said pair of groups of serially connected turns in series and extended from within said pair of annular coil end chambers through said axial passages in said pair of annular centering disks into said pair of additional annular chambers, said pair of groups of serially connected turns and said pair of hollow leads forming a hollow rotor winding, passages in said rotor body opening into said pair of additional annular chambers and suitable for communicating with a stationary inlet and a stationary outlet, respectively, for a liquid coolant, a pair of groups of pipe joints in said pair of additional annular chambers and connecting said extended hollow coil ends and said pair of extended hollow leads therein with said passages opening thereinto so as to unite said hollow rotor winding and said passages in said rotor body to a closed system of ducts suitable for conducting a liquid coolant from said stationary inlet to said stationary outlet, said serially connected turns in said system forming parallelly connected groups of said ducts, a pair of collector rings disposed on and coaxially arranged with said pair of lateral portions of said rotor body, and connection means in said pair of additional annular chambers and in said rotor body electrically connecting said pair of extended hollow leads pairwise with said pair of collector rings.

10. A liquid-cooled rotor for turbo-alternators, having a cylindrical rotor body with a medial portion of greater diameter and with a pair of lateral portions of smaller diameter, a pair of annular coil end chambers disposed laterally of said medial portion and coaxially with said rotor body, a pair of additional annular chambers disposed laterally of and adjacent to said pair of annular coil end chambers and coaxially with said pair of lateral portions, a pair of radially disposed partitions between adjacent chambers of said pairs of annular chambers, axial passages in said pair of partitions, axial slots in the cylindrical surface of said medial portion, hollow conductors in said axial slots, hollow coil ends within said pair of annular coil end chambers and hollow coil ends extended from within said pair of annular coil end chambers through said axial passages in said pair of partitions into said pair of additional annular chambers, said hollow coil ends and said extended hollow coil ends connecting said hollow conductors in series so as to form at least one pair of groups of serially connected turns defining a pair of poles of the rotor, a pair of hollow leads connected to said pair of groups of serially connected turns in series and extended through said axial passages in said pair of partitions into said pair of additional annular chambers, said pair of groups of serially connected turns and said pair of hollow leads forming a hollow rotor winding, clamp means in said axial passages of said partitions fixing said extended hollow coil ends and said pair of extended hollow leads thereto, passages in said rotor body opening into said pair of additional annular chambers and suitable to communicate with a stationary inlet and a stationary outlet, respectively, for a liquid coolant, a pair of groups of pipe joints in said pair of additional annular chambers and connecting said extended hollow coil ends and said pair of extended hollow leads therein with said passages opening thereinto so as to unite said hollow rotor winding and said passages in said rotor body to a closed system of ducts suitable for conducting a liquid coolant from said stationary inlet to said stationary outlet, said serially connected turns in said system forming parallelly connected groups of said ducts, a pair of collector rings disposed on and coaxially arranged with said pair of lateral portions of said rotor body, and connection means in said pair of additional annular chambers and in said rotor body electrically connecting said pair of extended hollow leads pairwise with said pair of collector rings.

11. A liquid-cooled rotor for turbo-alternators, having a cylindrical rotor body with a medial portion of greater diameter and with a pair of lateral portions of smaller diameter, a pair of annular coil end chambers disposed laterally of said medial portion and coaxially with said pair of lateral portions, axial slots in the cylindrical surface of said medial portion, hollow conductors in said axial slots, hollow coil ends disposed at least partly within said pair of annular coil end chambers and connecting said hollow conductors in series so as to form at least one pair of groups of serially connected turns defining a pair of poles of the rotor, a pair of hollow leads connected to said pair of groups of serially connected turns in series, said pair of groups of serially connected turns and said pair of hollow leads forming a hollow rotor winding, at least one pair of axial passages in said rotor body adapted to communicate with a stationary inlet and a stationary outlet, respectively, for a liquid coolant, a pair of groups of radial passages in said rotor body laterally of said pair of annular coil end chambers and pairwise communicating with said pair of axial passages, a pair of groups of radially disposed pipe joints laterally of said pair of annular coil end chambers and communicating with said hollow rotor winding and with said pair of groups of radial pasages so as to unite said hollow rotor winding, said pair of groups of radial passages and said pair of axial passages to a closed system of ducts suitable for conducting a liquid coolant from said stationary inlet to said stationary outlet, a pair of collector rings disposed on and coaxially arranged with said rotor body, and connection means electrically connecting said pair of hollow leads pairwise with said pair of collector rings.

12. A liquid-cooled rotor for turbo-alternators, having a cylindrical rotor body, a pair of annular coil end chambers disposed on and coaxially with said rotor body, a hollow rotor winding between a pair of collector rings on said rotor body and disposed partly in said pair of annular coil end chambers, at least one pair of axial passages in said rotor body for communicating with a stationary inlet and a stationary outlet, respectively, for a liquid coolant, a pair of groups of axially offset radial passages in said rotor body axially beyond said pair of annular coil end chambers and pairwise communicating with said pair of axial passages, a pair of groups of radially disposed pipe joints axially beyond said pair of annular coil end chambers and communicating with said rotor winding and with said pair of groups of axially offset radial passages so as to unite said hollow rotor winding, said pair of groups of axially offset radial passages and said pair of axial passages to a closed system of ducts suitable for conducting a liquid coolant from said stationary inlet to said stationary outlet.

13. A liquid-cooled rotor for turbo-alternators, having a cylindrical rotor body, a pair of annular coil end chambers disposed on and coaxially arranged with said rotor body, a hollow rotor winding between a pair of collector rings on said rotor body and disposed partly in said pair of annular coil end chambers, at least one pair of axial passages in said rotor body suitable for communicating with a stationary inlet and a stationary outlet, respectively, for a liquid coolant, radial passages in said rotor body axially beyond said pair of annular coil end chambers and groupwise communicating with said pair of axial passages, tubular casings made of electrically insulating material and disposed in said radial passages, radially disposed pipe joints axially beyond said pair of annular coil end chambers and protruding in said tubular casings, said pipe joints connecting said hollow rotor winding by means of said tubular casings with said radial passages so as to unite said hollow rotor winding, said radial passages and said pair of axial passages to a closed system of ducts suitable for conducting a liquid coolant from said stationary inlet to said stationary outlet.

14. A liquid-cooled rotor for turbo-alternators, having a cylindrical rotor body, a pair of annular coil end chambers disposed on and coaxially arranged with said rotor body, a hollow rotor winding between a pair of collector rings on said rotor body and disposed partly in said pair of annular coil end chambers, at least one pair of axial passages in said rotor body adapted to communicate with a stationary inlet and a stationary outlet, respectively, for a liquid coolant, one axial passage of said pair of axial passages for communicating with said stationary outlet being centrally disposed in said rotor body, a pair of groups of radial passages in said rotor body axially beyond said pair of annular coil end chambers and pairwise communicating with said pair of axial passages, a pair of groups radially disposed pipe joints axially beyond said pair of annular coil end chambers and communicating with said hollow rotor winding and with said pair of groups of radial passages so as to unite said hollow rotor winding, said pair of groups of radial passages and said pair of axial passages to a closed system of ducts suitable for conducting a liquid coolant from said stationary inlet to said stationary outlet.

References Cited in the file of this patent

FOREIGN PATENTS 1,014,215    Germany _______________ Aug. 22, 1957